No. 886,395. PATENTED MAY 5, 1908.
M. MOSKOWITZ.
SYSTEM OF ELECTRICAL REGULATION.
APPLICATION FILED JUNE 28, 1907.

UNITED STATES PATENT OFFICE.

MORRIS MOSKOWITZ, OF NEW YORK, N. Y., ASSIGNOR TO THE UNITED STATES LIGHT & HEATING COMPANY, A CORPORATION OF NEW JERSEY.

SYSTEM OF ELECTRICAL REGULATION.

No. 886,395.  Specification of Letters Patent.  Patented May 5, 1908.

Application filed June 28, 1907. Serial No. 381,213.

*To all whom it may concern:*

Be it known that I, MORRIS MOSKOWITZ, a citizen of the United States, and a resident of the borough of Brooklyn, county of Kings, city and State of New York, have invented certain new and useful Improvements in Systems of Electrical Regulation, of which the following is a specification, accompanied by drawings.

This invention relates to systems of electrical regulation in which a compensating storage battery is used, and the object of the invention is primarily to efficiently vary the output of the generator in accordance with the load on the work circuit, although other objects of the invention will hereinafter appear.

This invention is in some respects an improvement on United States Patent, No. 746,558, granted to me December 8, 1903, although the present invention discloses additional features of regulation and control of the system.

The invention consists of apparatus substantially as hereinafter fully described and claimed in this specification and shown in the accompanying drawings, in which,—

Figure 1:
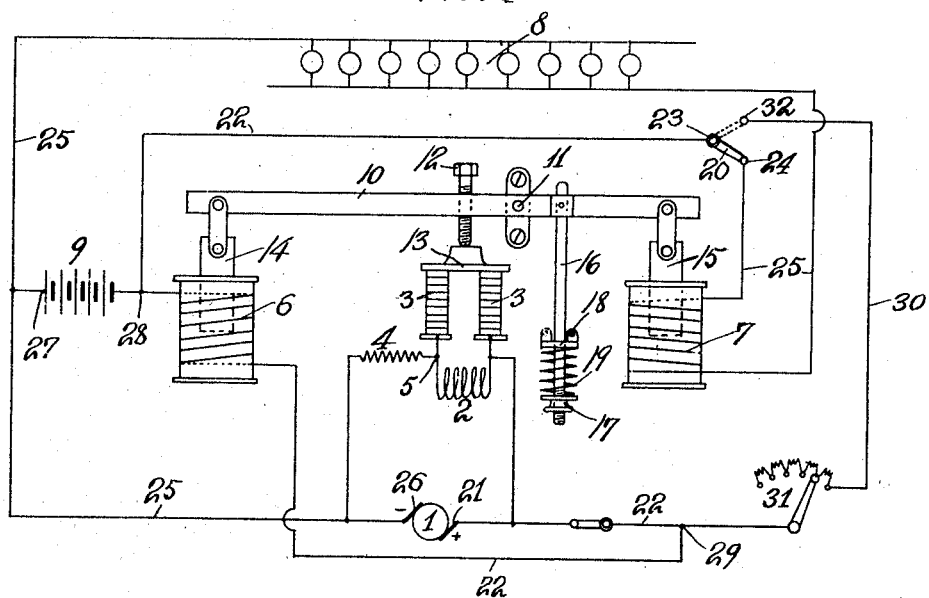
Figure 2:
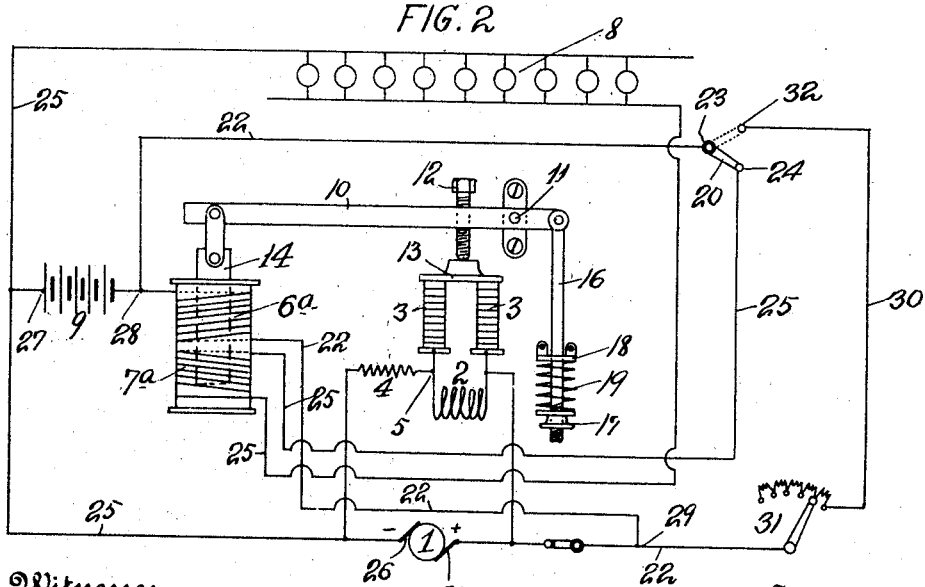

Figures 1 and 2 are diagrammatic representations of systems of electrical regulation embodying the invention.

Referring to the drawings, 1 represents the main generator, which may be a machine subject to variations in speed, as for instance a dynamo electric machine adapted for car lighting from the axle and arranged to be driven from the axle, although the system in accordance with this invention may be used in any connection in which it is applicable.

The generator 1 is provided with a shunt field 2 and a variable resistance 3, which may be a carbon resistance, is connected in shunt to the field 2. A permanent resistance 4 is connected between the point 5 on the field and one of the brushes of the armature of the machine 1. The function of resistance 4 is to determine the maximum amount of current which can flow through the field circuit, or in other words, the permanent resistance 4 establishes a circuit or path for the current through the field of a certain current carrying capacity, and then more or less of this current is shunted away by means of the variable resistance 3.

Regulating means are provided for varying the carbon resistance 3, and in accordance with this invention the regulator is provided with a coil 6 in the main generator circuit, and another opposing coil 7 in the work circuit, illustrated in this instance as a lamp circuit provided with the lamps 8, although these may be any translating devices. A compensating storage battery 9 is shown connected in parallel across the line.

The regulator is adapted to compress or release the carbon blocks of the resistance, and as shown, a lever 10 is pivoted at 11 and provided with an adjustable set screw 12 adapted to bear on the bridge piece 13 bearing on the piles of carbon blocks. One end of the lever 10 is pivotally connected to the core 14 of the magnet 6 in the main generator circuit, while the other end of the lever is connected to the core 15 of the magnet 7 in the work circuit. Between the pivotal point 11 of the lever and the core 15 is pivotally connected a rod 16 having an adjusting thumb nut 17 at one end, between which nut and the stops 18 is arranged a compression spring 19 adapted to exert pressure on the end of the rod 16 and produce a mechanical force opposing the action of the magnet 6.

Means are provided for cutting out the magnet 7 when the work circuit is cut out, as for instance, during the day run when the lights are not burning, and for this purpose a switch 20 is provided. Suitable circuits and connections are provided for connecting the parts of the system, and as shown, from the positive brush 21 on the generator the wire 22 leads to the magnet 6, from thence to the pivot 23 of the switch 20, and from the contact 24 of said switch a wire 25 leads to the work circuit magnet 7, from thence to the work circuit and back to the negative brush 26 of the generator. The battery 9 is connected across the line between the points 27 and 28. Another circuit leads from the point 29 on the wire 22 adjacent the brush 21 by wire 30, and through a variable rheostat 31 and thence, still by wire 30, to the contact 32 of the switch 20.

In accordance with this invention when the switch 20 is in the position shown in full lines, the current passes from the positive brush 21, by wire 22 through magnet 6, thence through the switch 20 by wire 25 through magnet 7, thence by wire 25 through the work circuit and back to the negative brush 26 of the generator. If the switch 20 is turned to the position shown in dotted lines upon contact 32, current will pass from the brush 21 of the generator to the point 29, thence by wire 30 through rheostat 31, and still by wire 30 to and through the switch 20, thence by wire 22 to the point 28 adjacent the storage battery, through the storage battery 9 and back by wire 25 to the negative brush of the generator, thus charging the battery. Under these latter circumstances the work circuit is cut out and the current passes to the storage battery. At the same time current passes from brush 21 by wire 22, to and through magnet 6, through the storage battery and back to wire 22 to the brush 26. The magnet 7 is cut out and magnet 6 is partially short circuited through resistance 31.

When the switch 20 is in the position shown in full lines, and the coils 6 and 7 are included in circuit and the current is passing to the work circuit while a small current passes to the storage battery, the organization of circuits and apparatus is such that the output of the generator 1 is varied with the load on the work circuit, and substantially the same voltage is maintained on the lamps regardless of the number of lamps, because when the load on the work circuit is increased, the increased current will flow through the auxiliary magnet 7, thereby opposing an increased force to the action of the magnet 6, thereby relieving the pressure on the carbon blocks 3, and increasing the resistance of the by path to the field 2, thus permitting more current to pass through said field and raising the voltage of the generator in accordance with the demand. On the other hand when the load on the work circuit is decreased the energization of the auxiliary magnet 7 is decreased, thus opposing less force to the action of the magnet 6 and permitting the carbon blocks 3 to be more strongly compressed, which shunts away more current from the field 2 and reduces the voltage of the generator. The current of the generator is also varied in accordance with its speed and maintained substantially constant by the action of the generator because as the speed increases the magnet 6 will attract its core 14 with increasing strength, thus pressing the carbon blocks 3 more tightly together, reducing the resistance 3 and thereby shunting current away from the field of the generator to weaken the said field and bring the current back to approximately its normal condition.

When the regulator is operating with magnet 7 in circuit, the current passing through the battery is a comparatively small one and is just enough to regulate the generator under speed variations, and yet not enough to cause the counter electro motive force of the battery to rise to any great extent. During the day run when the lights are turned off the generator output is raised to charge the battery.

It will be seen that the magnet 6 is weakened by short circuiting said magnet when the switch 20 is turned from the contact 24 to the contact 32. The amount of such short circuiting may be regulated by means of the variable resistance 31, although this variable rheostat may be omitted entirely if desired and a fixed resistance used instead.

In Fig. 2 a modification of the invention is shown, in which two coils $6^a$ and $7^a$ are differentially wound upon the same magnet. In this instance the effect is the same as in the organization shown in Fig. 1, and the arrangement of circuits is the same. From the brush 21 the wire 22 leads to the coil 6, and from thence to the switch 20, and thence the wire 25 leads to the coil $7^a$, then to and through the work circuit and back to the brush 26. The wire 30 leads from the point 29 on wire 22 to and through the rheostat 31 and thence to the switch 20, so that when the switch is in the position indicated in full lines the work circuit is connected to the generator and the coils $6^a$ and $7^a$ are connected in circuit. When the switch is moved to the dotted position shown in Fig. 2 the coil is cut out, the work circuit is cut out, and magnet $6^a$ is short circuited.

I claim and desire to obtain by Letters Patent the following:

1. A system of electrical regulation, comprising a work circuit, a generator having a shunt field, a compensating storage battery in parallel across the line and a regulator for varying the said field, having a magnet coil in the main generator circuit, means for producing a mechanical force opposing said magnet coil, and a coil in the work circuit assisting said mechanical force and means for breaking the work circuit so connected as to deënergize one of said coils and short-circuit the other.

2. A system of electrical regulation, comprising a generator having a shunt field, through which a circuit of a given current carrying capacity is established by means of resistance independent of the field, and variable means connected to shunt away a part of the current in said field circuit, said means being controlled by the main generator current and the current in the work circuit and means for breaking the work circuit so connected as to deënergize one of said coils and short-circuit the other.

3. A system of electrical regulation, comprising a generator having a shunt field, through which a circuit of a given current carrying capacity is established by means of resistance independent of the field, and a regulator connected to shunt away a part of the current in said field circuit, said regulator being provided with opposing controlling coils, one in the main generator circuit and one in the work circuit and means for breaking the work circuit so connected as to deenergize one of said coils and short-circuit the other.

4. A system of electrical regulation, comprising a work circuit, a generator having a shunt field, a compensating storage battery in parallel across the line, a regulator for varying the said field, having a magnet coil in the main generator circuit and an opposing coil in the work circuit, and means for breaking the work circuit so connected as to deënergize one of said coils and short-circuit the other.

In testimony whereof I have signed this specification in the presence of two subscribing witnesses.

MORRIS MOSKOWITZ.

Witnesses:
OLIN A. FOSTER,
HERMAN MORRIS.